(12) United States Patent
Noma et al.

(10) Patent No.: US 7,301,560 B2
(45) Date of Patent: Nov. 27, 2007

(54) THREE-DIMENSIONAL FIELD FOR CALIBRATION AND METHOD OF PHOTOGRAPHING THE SAME

(75) Inventors: Takayuki Noma, Tokyo (JP); Tadayuki Ito, Tokyo (JP); Hitoshi Otani, Tokyo (JP); Mitsuharu Yamada, Tokyo (JP); Nobuo Kochi, Tokyo (JP)

(73) Assignee: Topcon Corporation, Tokyo (JP)

( * ) Notice: Subject to any disclaimer, the term of this patent is extended or adjusted under 35 U.S.C. 154(b) by 730 days.

(21) Appl. No.: 10/853,741

(22) Filed: May 26, 2004

(65) Prior Publication Data

US 2005/0012844 A1    Jan. 20, 2005

(30) Foreign Application Priority Data

May 26, 2003    (JP) ............................. 2003-147209

(51) Int. Cl.
*H04N 17/00*    (2006.01)
(52) U.S. Cl. .................................................. 348/187
(58) Field of Classification Search ................ 348/187, 348/188, 189, 175, 177, 180, 181, 184, 185
See application file for complete search history.

(56) References Cited

U.S. PATENT DOCUMENTS

| | | | |
|---|---|---|---|
| 6,026,172 A | 2/2000 | Lewis, Jr. et al. | |
| 6,686,953 B1 * | 2/2004 | Holmes | 348/179 |
| 6,768,509 B1 * | 7/2004 | Bradski et al. | 348/207.99 |
| 6,915,072 B2 * | 7/2005 | Takahashi et al. | 396/296 |
| 2004/0027456 A1 * | 2/2004 | Pierce | 348/175 |
| 2004/0066454 A1 * | 4/2004 | Otani et al. | 348/188 |
| 2005/0207640 A1 * | 9/2005 | Kim et al. | 382/154 |

FOREIGN PATENT DOCUMENTS

| | | |
|---|---|---|
| EP | 1 378 790 A2 | 1/2004 |
| EP | 1 484 576 A2 | 12/2004 |
| JP | 2001-280956 A | 10/2001 |

\* cited by examiner

*Primary Examiner*—Paulos M. Natnael
(74) *Attorney, Agent, or Firm*—Foley & Lardner LLP

(57) ABSTRACT

A three-dimensional field for calibration having a wide-angle area 110 and a zooming area 120 located within an area overlapped with the wide-angle area 110 comprises: a plurality of rough alignment reference marks 122 for zooming and a plurality of precise alignment reference marks 124 for zooming, and the rough alignment reference marks 122 and the precise alignment reference marks 124 for zooming being arranged within the zooming area 120; and a plurality of rough alignment reference marks 112 for wide-angle and a plurality of precise alignment reference marks 114 for wide-angle, the rough alignment reference marks 112 and the precise alignment reference 124 marks for wide-angle being arranged within the wide-angle area 110.

8 Claims, 5 Drawing Sheets

120: zooming area

THREE-DIMENSIONAL FIELD FOR CALIBRATION AND METHOD OF PHOTOGRAPHING THE SAME

BACKGROUND OF TH INVENTION

This invention relates to a three-dimensional field for calibration for use in exactly measuring internal parameters, such as a principal point position, a screen distance (focal length) and a distortion parameter of a lens, necessary to correct an image distortion of a camera. This invention also relates to a method of photographing a three-dimensional field for calibration to obtain a calibration image for use in measuring internal parameters of a camera.

Conventionally, in the field of photogrammetry or photographic measurement it has been important to obtain an image with less aberration. For this purpose, in these fields a high-accuracy lens with small aberration has been used for a photographic camera, as disclosed in JP-A-2001-280956. Further, in the field of phtogrammetry, each of the multiple points positioned and precisely measured in three dimension is measured in plural directions and then the internal parameters, such as a principal point position, a screen distance (focal length) and a distortion parameter, of a camera are analytically obtained, while, in the field of photographic measurement, the internal parameters of a fabricated camera are obtained by precisely measuring the camera.

Recently a digital camera with an image pick up device (charge coupled image sensor) is in widespread use. There are provided a number of models of the digital camera having a so called zoom lens capable of varying a focal length thereof. Use of a zoom lens is effective to adjust an area or size that the image of an object to be measured occupies in an image projected on a film because it is unnecessary to move the camera relative to the object to be measured. Accordingly, it will become easy to perform a three-dimensional image measurement if the zoom lens can be applied to the photographic measurement. However, there is a problem in use of the zoom lens that a calibration work becomes complicated due to a variation of internal parameters of the camera depending on a change in the focal length of the zoom lens.

Specifically, when a three-dimensional field for calibration having multiplicity of points (targets) that are precisely measured and positioned thereon in three dimensions is taken with a camera to be calibrated, it is preferable that the three-dimensional field for calibration is taken so as to occupy fully an image projected on a film or CCD. Unfortunately, the size of an object to be photographed varies according to the variation in focal length of the zoom lens. For photographing the three-dimensional field for calibration so as to fully occupy the projected image, it is therefore necessary to shorten the distance between the three-dimensional field for calibration and camera under a wide-angle condition, while it is necessary to lengthen it under a zooming condition. Under some zooming conditions, the required distance between the three-dimensional field for calibration and camera is, for example, about 10 to 20 meters, which requires an expansive space for the three-dimensional field for calibration to be placed. It is therefore a further problem that a space available for photographing the three-dimensional field for calibration and performing an associated calibration work calibrate is limited.

In photographing the three-dimensional field for calibration, it is also preferable that the targets located in the three-dimensional field for calibration are derived in a mode in which those targets can be clearly recognized and taken with a camera to be calibrated. On the other hand, in many cases, near the three-dimensional field for calibration are placed tools or instruments regardless of calibration and they may be projected as inutile objects on an photographed image of the three-dimensional field for calibration. Accordingly, it is also a problem that there is provided a noise or bar for a calibration work performed every focal length of a zoom lens.

SUMMARY OF THE INVENTION

The invention was made to solve the problems described above and a first object of the invention is to provide a three-dimensional field which allows to photograph a three-dimensional field for calibration and calibrate using a zoom lens capable of varying its focal length even though in a relatively small space. A second object of the invention is to provide a method of photographing a three-dimensional field for calibration which allows targets in a three-dimensional field for calibration to be photographed in a mode in which they can be clearly recognized.

To realize those objects, the three-dimensional field having, as shown in FIGS. 1 and 2, a wide-angle area 110 and a zooming area 120; located within an area overlapped with the wide-angle area 110, comprises: a plurality of rough alignment reference marks (targets) 122 for zooming and a plurality of precise alignment reference marks (targets) 124 for zooming, the rough alignment reference marks 122 and the precise alignment reference marks 124 for zooming being arranged within the zooming area 120; and a plurality of rough alignment reference marks (targets) 112 for wide-angle and a plurality of precise alignment reference marks (targets) 114 for wide-angle, the rough alignment reference marks 112 and the precise alignment reference marks 114 for wide-angle being arranged within the wide-angle area 110.

In such an apparatus, the wide-angle area 110 is used to photograph for obtaining a calibration image on the wide-angle side of a zoom lens and also provided with the rough alignment reference marks 112 for wide-angle for use in a rough alignment in a photographed calibration image and with the precise alignment reference marks 114 for wide-angle for use in a precise alignment in the photographed calibration image. The zooming area 120 is used to photograph for obtaining a calibration image on the zooming side of the zoom lens and also provided with the rough alignment reference marks 122 for zooming for use in a rough alignment in a photographed calibration image and with the precise alignment reference marks 124 for zooming for use in a precise alignment in a photographed calibration image. Since the zooming area 120 is located in a small area overlapped with the wide-angle area 110, the calibration image can be taken even if it is difficult to satisfactorily secure a distance between the photographic camera and the three-dimensional field.

In the inventive three-dimensional field for calibration, it is preferred that each of the reference marks (112, 114, 122, 124) is constituted of a reflective target. Therefore, the reference marks in the calibration image taken with the camera have a high intensity and the contrast between the reference marks and the background surface of the three-dimensional field for calibration can be easily secured.

In the inventive three-dimensional field for calibration, it is preferred that at least one of the rough alignment reference marks 112 for wide-angle is generally positioned at the center of the wide-angle area 110 and within the zooming area 120, the precise reference marks 124 for zooming are positioned within the zooming area 120, and at least one of the precise alignment reference marks 114 for wide-angle is positioned within the wide-angle area 110 surrounding the zooming area 120. The consistency between the wide-angle area 110 and the zooming area 120 is increased and both the wide-angle area 110 and the zooming area 120 are available for calibration at intermediate focal lengths corresponding to the boundary area between the wide-angle area 110 and zooming area 120.

In the inventive three-dimensional field for calibration, it is preferred that the rough alignment reference marks (112, 122) for zooming or wide-angle are formed in a mode in which they are distinct from the precise alignment reference marks (114, 124) for zooming or wide-angle. It is therefore easy to distinguish between the reference marks for rough alignment and the reference marks for precise alignment. This mode means a mode allowing to be distinct with at least one of a form, color and pattern, for example.

In the inventive three-dimensional field for calibration, it is preferred that at least one among the rough alignment reference marks (112, 122) for zooming or wide-angle and the precise alignment reference marks (122, 124) for zooming or wide-angle has a height different from a height of other reference marks. It is therefore possible to calibrate three dimensionally in a calibration image taken with a camera.

In the inventive three-dimensional field for calibration, it is preferred that the rough alignment reference marks 112 for wide-angle have a geometry larger than that of the rough alignment reference marks 122 for zooming; and the precise alignment reference marks 114 for wide-angle have a geometry larger than that of the precise alignment reference 124 marks for zooming. Accordingly, the reference marks for zooming which were photographed on the wide-angle side have a small size in a photographed calibration image. It is therefore easy to identify the reference marks for wide-angle. Also, the reference marks for zooming which were photographed on the zooming side are projected with a size suitable to be identified.

In the inventive three-dimensional field for calibration, it is preferred that at least one among the rough alignment reference marks 112 for wide-angle and the rough alignment reference marks 122 for zooming has a geometry to be used as both the rough alignment reference marks (112, 122) for wide-angle and zooming. The consistency between the wide-angle area 110 and the zooming area 120 is increased and both the wide-angle area 110 and the zooming area 120 are available for calibration at intermediate focal lengths corresponding to the boundary area between the wide-angle area 110 and zooming area 120.

To realize those objects, the inventive method of photographing a three-dimensional field for calibration according to the invention is, as shown in FIG. 5, a method of photographing with a camera for photographing a three-dimensional field for calibration, of any one of claim 1 to claim 7, to obtain an image of the calibration, comprising the steps of: setting the exposure of the camera for photographing a calibration image to be overexposed for an background, excluding the reference marks of the three-dimensional field 100 for calibration, and to be underexposed for the reference marks of the three-dimensional field 100 for calibration (S100); photographing the three-dimensional field (100) for calibration by strobing with the camera for photographing a calibration image (S102); and forming the image of the calibration so as to highlight the contrast thereof (S104).

This application is based on Japanese patent application, No. 2003-147209 filed in Japan on May 26, which is entirely incorporated herein by reference.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

DESCRIPTION OF THE PREFERRED EMBODIMENTS

Figure 1:
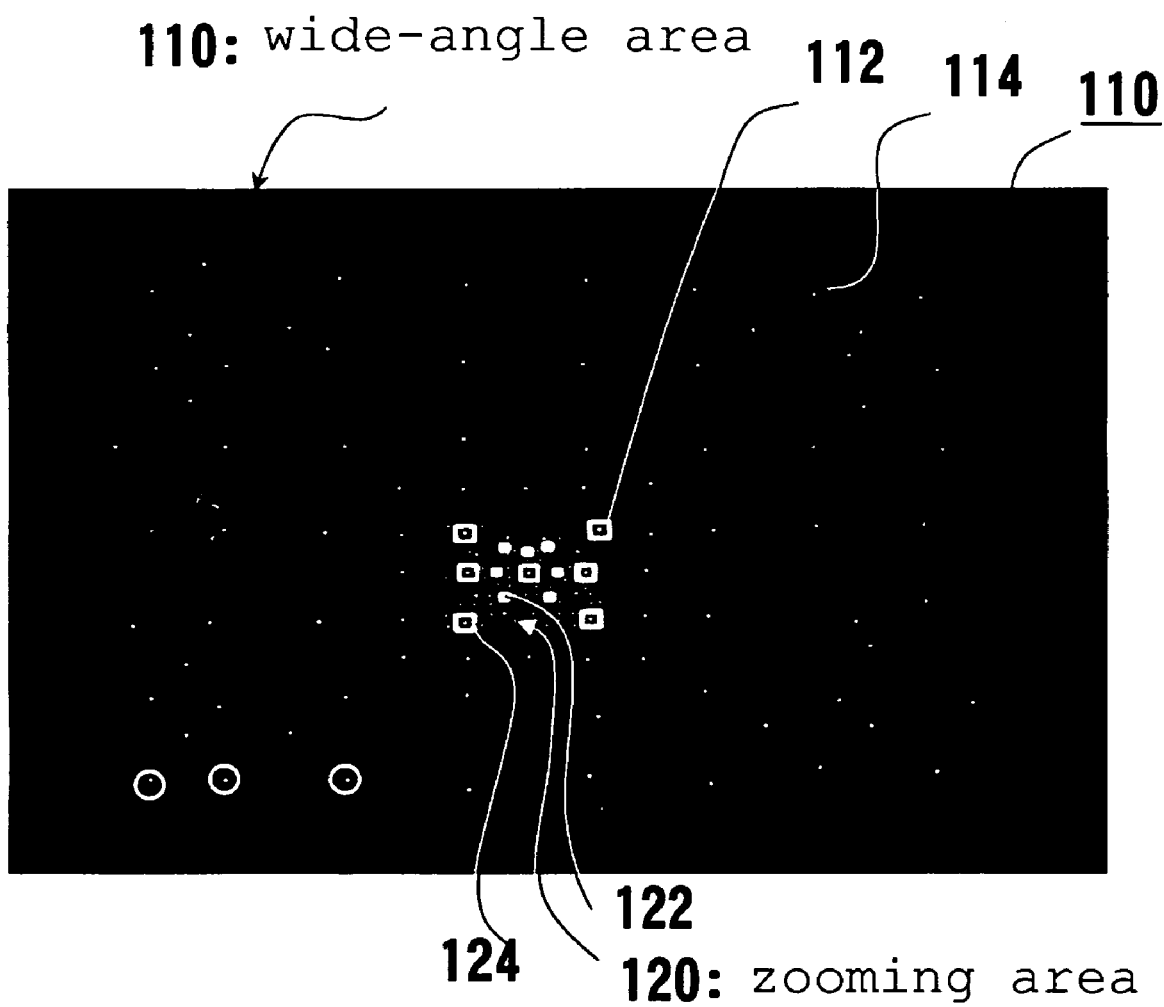
FIG. 1 is a overall view of a first embodiment of the invention, illustrating with a light and shade binary image.
Figure 2:
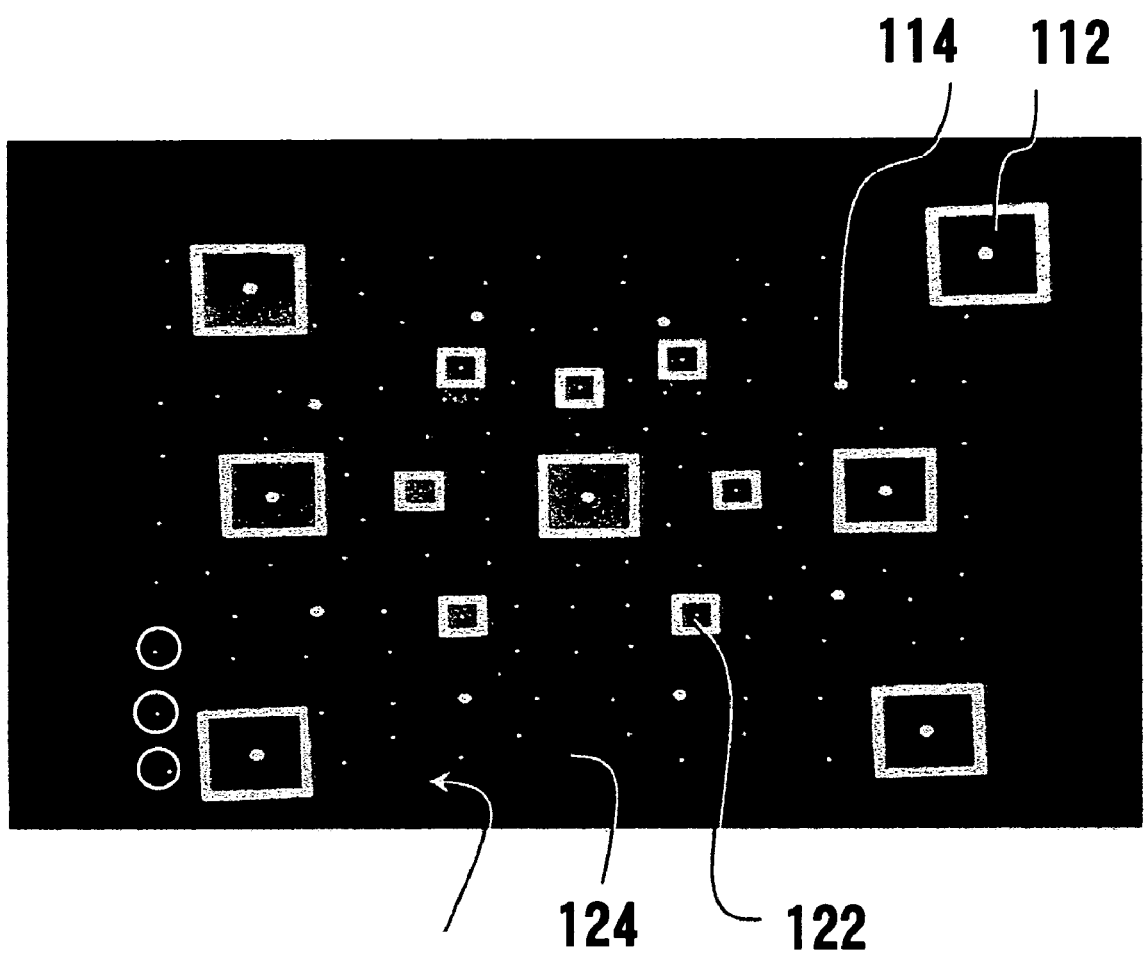
FIG. 2 is a partially enlarged view of FIG. 1 as a overall view, illustrating a zooming area with a light and shade binary image.

The invention is hereinafter described with reference to the accompanying drawings, in which: FIG. 1 is a overall view of a first embodiment of the invention, illustrating with a light and shade binary image; and FIG. 2 is a partially enlarged view of FIG. 1 as a overall view, illustrating a zooming area with a light and shade binary image. A three-dimensional field 100 has a wide-angle area 110 and a zooming area 120 which is located within an area overlapped with the wide-angle area 110.

The wide-angle area 110 is used to take a calibration image on the wide-angle side of a zoom lens and also provided with a rough alignment reference marks (targets) 112 for wide-angle for use in rough alignment in a photographed calibration image and provided with precise alignment reference marks (targets) 114 for wide-angle for use in precise alignment in the photographed calibration image. In the vicinity of the zooming area 120 are provided seven rough alignment reference marks 112 for wide-angle so that it is secured to photograph even though the zoom lens has a smaller angle of view. For example, 100 to 200 of the precise alignment reference marks 114 for wide-angle are evenly distributed with a density so as to be projected evenly on a photographed calibration image. The rough alignment reference marks 112 for wide-angle have a center in a shape of, for example, a circle (a star and a triangle also permitted) and a closing line in a shape of a rectangular which circumscribes the center. Alternatively, the closing line may be in a shape of a circle and a polygon other than a triangle. In other words, any other shape by which the rough alignment reference mark 112 for wide-angle can be clearly identified may be used.

The zooming area 120 is used to take a calibration image on the zooming side of the zoom lens and also provided with rough alignment reference marks (targets) 122 for zooming for use in rough alignment in a photographed calibration image and provided with precise alignment reference marks (targets) 124 for zooming for use in precise alignment in the photographed calibration image. Since the zooming area 120 is located in a small area surrounded by the wide-angle area 110, the calibration image can be photographed with a zoom lens which has a small angle of view and of which focal length is set on the zooming side, even if an distance between the photographic camera and the three-dimensional field is not enough.

In the vicinity of the center of the zooming area 120 are provided seven rough alignment reference marks 122 for zooming so that it is secured to photograph even though the zoom lens has a smaller angle of view. For example, 100 to 200 of the precise alignment reference marks 124 for zooming are evenly distributed with a density so as to be projected evenly on the photographed calibration image. The rough alignment reference marks 122 for zooming have a center and a closing line, each in the same shape as of the rough alignment reference marks 124 for zooming. Alternatively, the closing line may be in a shape of a circle and a polygon other than a triangle. In other words, any other shape by which the rough alignment reference mark 122 for zooming can be clearly identified may be used.

The rough alignment reference marks 112 for wide-angle have a geometry larger than that of the rough alignment reference marks 122 for zooming; and the precise alignment reference marks 114 for wide-angle have a geometry larger than that of the precise alignment reference 124 marks for zooming. Accordingly, the reference marks 122, 124 for zooming which were photographed on the wide-angle side of the zoom lens have a small size in the photographed calibration image. It is therefore easy to identify the reference marks 112, 114 for wide-angle. Also, the reference marks 122, 124 for zooming which were photographed on the zooming side of the zoom lens are projected with a size suitable to be identified in the photographed calibration image.

Figure 3:
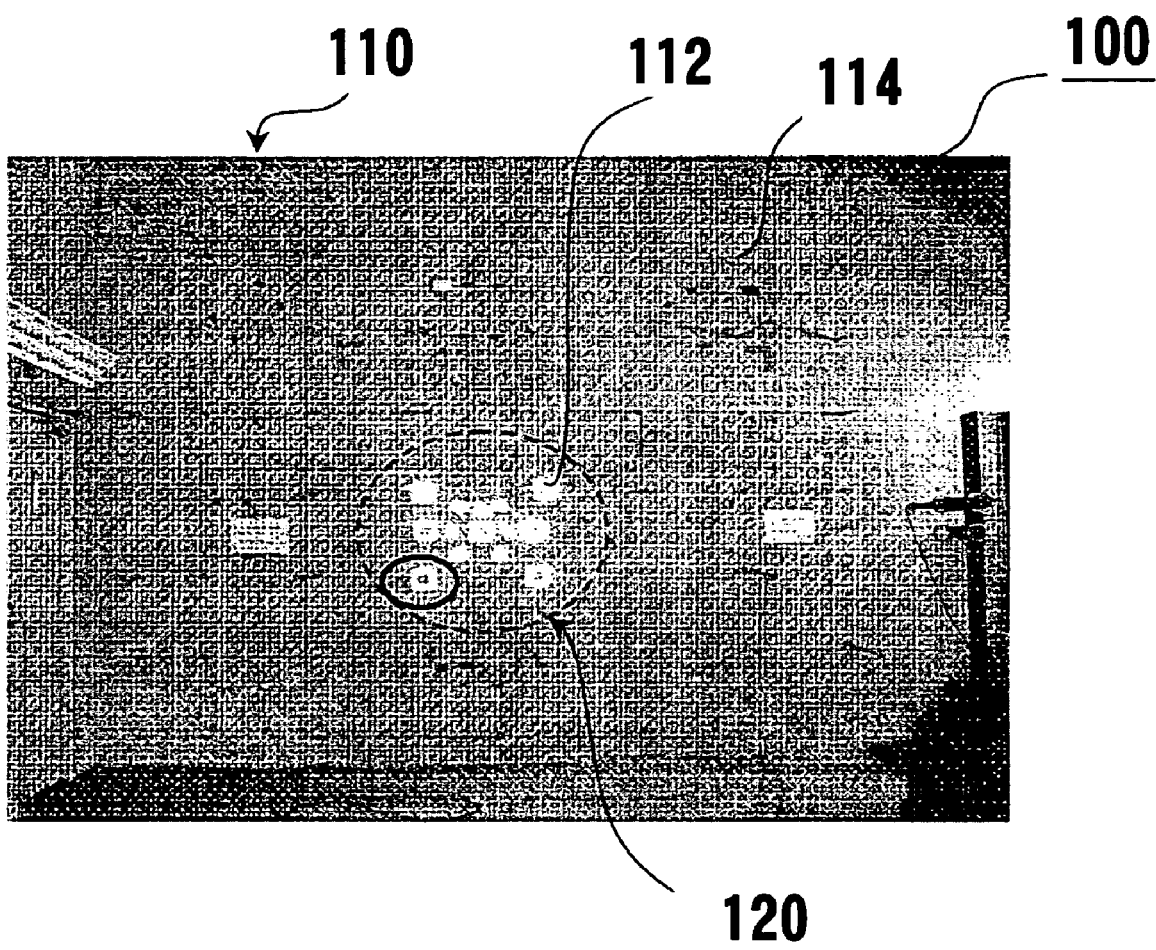
FIG. 3 is a overall view, illustrating a site where a three-dimensional field 100 for calibration is placed.
Figure 4:
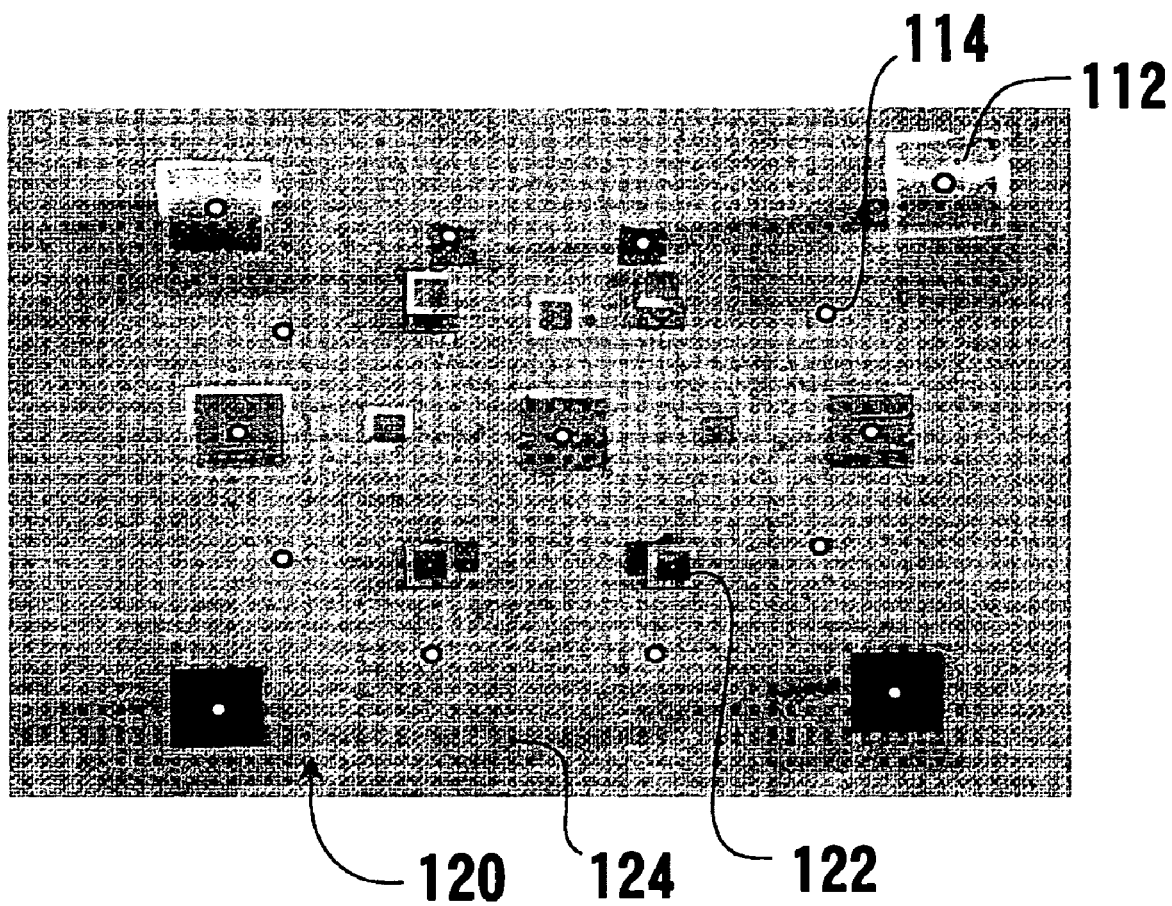
FIG. 4 is a partially enlarged view of FIG. 3 as a overall view, illustrating a zooming area.

Next, a site where the three-dimensional field 100 for calibration is placed will be described, with reference to the drawings. FIG. 3 is an overall view, illustrating the site where the three-dimensional field 100 for calibration is placed, and FIG. 4 is a partially enlarged view of FIG. 3 as an overall view, illustrating a zooming area. The three-dimensional field 100 is provided in an environment of a less variation of temperature, for example, a basement or cellar so that the relative positions between the reference marks for wide-angle and the reference marks for zooming cannot be varied. On a wall surface, such as a concrete wall, is fixed a target board indicating the reference marks 112, 114 for wide-angle and the reference marks 122, 124 for zooming.

For each of the reference marks 112, 114, 122, 124, a reflective reference target having a high reflectivity is used, resulting in an easy photographing of a calibration image as a light and shade binary image. By use of a reference mark having a high reflectivity, such as a glass plate, on which aluminium is deposited, the reference marks having a high intensity are projected on a photographed calibration image. It is therefore easy to obtain a sufficient contrast between the reference marks and the background of the three-dimensional field for calibration. The height of the reference mark is adjusted by changing the height of the target board from the surface of a concrete wall, for example. Evenly locating the reference marks having a variety of heights all over the calibration image, internal parameters of the zoom lens to be calibrated are exactly calculated.

Figure 5:
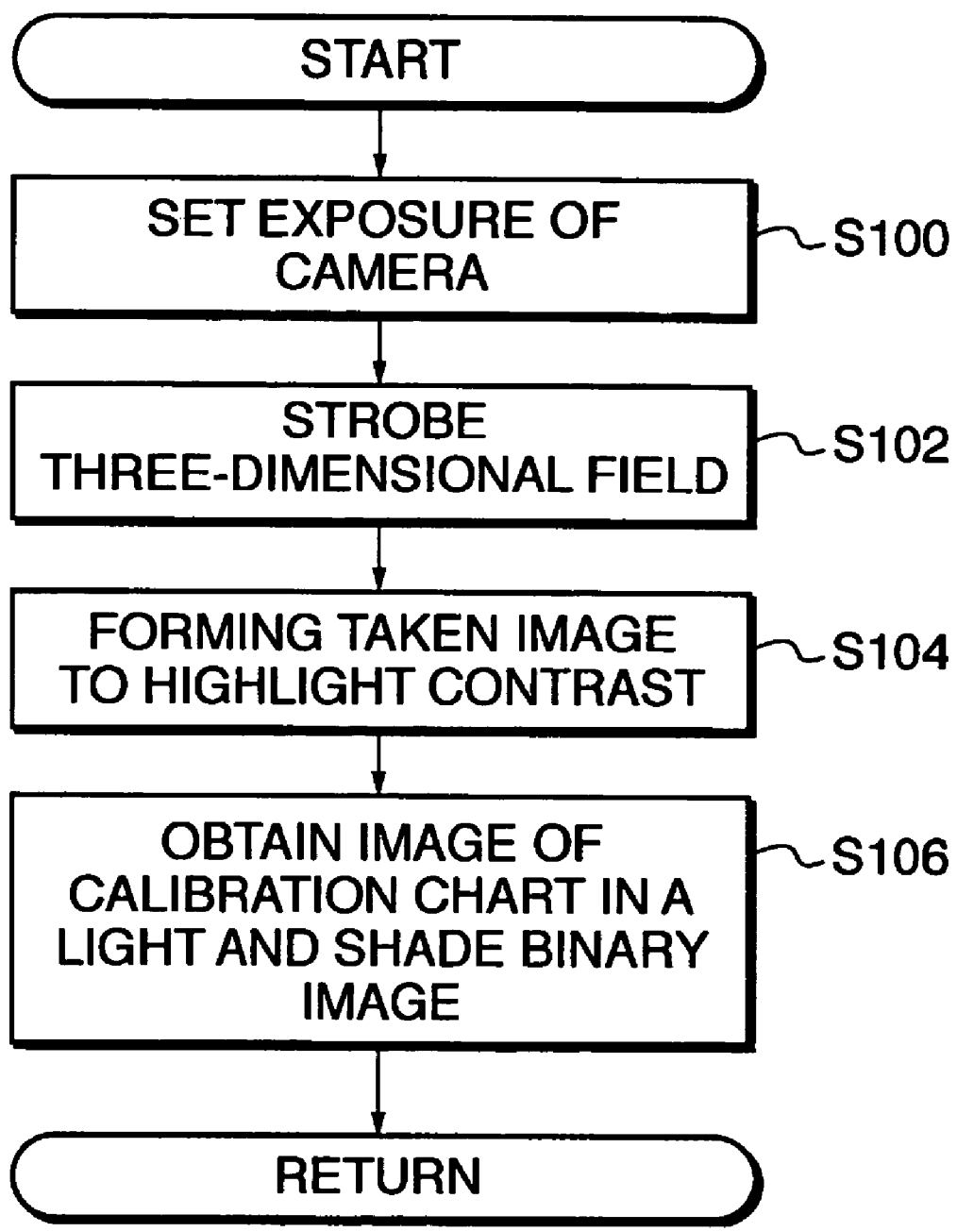
FIG. 5 is a flow chart, illustrating a procedure of photographing a three-dimensional field for calibration with a zoom lens to be calibrated.

FIG. 5 is a flow chart, illustrating a procedure of photographing a three-dimensional field for calibration with a zoom lens to be calibrated. First of all, the exposure of the camera for photographing a calibration image is set to be overexposed for an background excluding the reference marks of the three-dimensional field for calibration, and to be underexposed for the reference marks of the three-dimensional field for calibration (S100). Secondly, the three-dimensional field for calibration is photographed by strobing with the camera for photographing a calibration image (S102). In this step, since the calibration image can be photographed with the zoom lens for which aperture is closed at a minimum value, a depth of field becomes deep. It is therefore easy to obtain a clear image for analysis even if be photographed out of focus.

Subsequently, the image of the calibration is formed so as to highlight the contrast thereof (S104). The image of the calibration photographed in such a manner is a binary image in which a background image, such as a concrete wall surface, of the three-dimensional field for calibration is shaded and both the reference marks 112, 114 for wide-angle and the reference marks 122, 124 are lightened (S106).

The image of the calibration obtained in a way as described, is used for comparatively calculating the measured three-dimensional position of the formed binary image and the three-dimensional coordinates of the reference marks 112, 114 for wide-angle and the reference marks 122, 124 for zooming to analytically obtain internal parameters (a principal point position, screen distance and distortion parameter) of the camera every focal length of the zoom lens. The background area, excluding the reference marks of the three-dimensional field 100 for calibration, is brought to an evenly shaded area of the image. Accordingly, in a calibration work as a post-process using the image of the calibration, both the reference marks 112, 122 for wide-angle and the reference marks 122, 124 for zooming can be exactly detected. For example, the experiment performed by the inventors shows that the detection accuracy of a median point of the reference mark (target) is approximately 1/10 in the binary image, while that in the image on which a wall surface in the background was projected is approximately 1/4, that is, degraded about two to three times of the former.

Although, in the embodiment described above, both the reference marks for wide-angle and the reference marks for zooming are commonly fixed on the wall surface, the invention is not limited to it. For example, the reference marks for wide-angle are fixed to a wall surface, the reference marks for zooming may be fixed to a movable panel so that the reference marks for zooming is moved and positioned relative to the wall surface for positioning the reference marks for wide-angle and the reference marks for zooming.

As is described above, with use of the three-dimensional calibration field of the invention, a photographed calibration image can be obtained, without adjustment of the distance between the photographic camera and the three-dimensional field for calibration, by photographing the wide-angle area when the focal length exists on the wide-angle side and by photographing the zooming area when on the zooming side, even if a sufficient distance between the camera and the three-dimensional field for calibration cannot be securely obtained.

Also, according to the method of photographing the three-dimensional field for calibration of the invention, since the calibration image can be photographed with the zoom lens for which aperture is closed at a minimum value, a depth of field becomes deep. It is therefore easy to obtain a clear image for analysis even if be photographed out of focus. When the calibration image is photographed so as to obtain the calibration image as a binary image, a higher detection accuracy of median point of each reference mark (target) can be provided in the calibration work.

What is claimed is:

1. A three-dimensional field for calibration having a wide-angle area and a zooming area located within an area overlapped with the wide-angle area, comprising:
    a plurality of rough alignment reference marks for zooming and a plurality of precise alignment reference marks for zooming, the rough alignment reference marks and the precise alignment reference marks for zooming being arranged within the zooming area; and
    a plurality of rough alignment reference marks for wide-angle and a plurality of precise alignment reference marks for wide-angle, the rough alignment reference marks and the precise alignment reference marks for wide-angle being arranged within the wide-angle area.

2. The three-dimensional field for calibration of claim 1, wherein each of the reference marks is constituted of a reflective target.

3. The three-dimensional field for calibration of claim 1, wherein at least one of the rough alignment reference marks for wide-angle is generally positioned at the center of the wide-angle area and within the zooming area;
    the precise reference marks for zooming are positioned within the zooming area; and
    at least one of the precise alignment reference marks for wide-angle is positioned within the wide-angle area surrounding the zooming area.

4. The three-dimensional field for calibration of claim 1, wherein the rough alignment reference marks for zooming or wide-angle are formed in a distinct mode in which they are distinct from the precise alignment reference marks for zooming or wide-angle.

5. The three-dimensional field for calibration of claim 1, wherein at least one among the rough alignment reference marks for zooming or wide-angle and the precise alignment reference marks for zooming or wide-angle has a height different from a height of other reference marks.

6. The three-dimensional field for calibration of claim 1, wherein the rough alignment reference marks for wide-angle have a geometry larger than that of the rough alignment reference marks for zooming; and
    the precise alignment reference marks for wide-angle have a geometry larger than that of the precise alignment reference marks for zooming.

7. The three-dimensional field for calibration of claim 1, wherein at least one among the rough alignment reference marks for wide-angle and the rough alignment reference marks for zooming has a geometry to be used as both the rough alignment reference marks for wide-angle and the rough alignment reference marks for zooming.

8. A method of photographing with a camera for photographing a three-dimensional field for calibration of claim 1, to obtain an image of the calibration, comprising the steps of:
    setting the exposure of the camera for photographing a calibration image to be overexposed for an background, excluding the reference marks of the three-dimensional field for calibration, and to be underexposed for the reference marks of the three-dimensional field for calibration;
    photographing the three-dimensional field for calibration by strobing with the camera for photographing to obtain a calibration image; and
    forming the image of the calibration so as to highlight the contrast thereof.

* * * * *